US008065255B2

(12) United States Patent
Colena et al.

(10) Patent No.: US 8,065,255 B2
(45) Date of Patent: Nov. 22, 2011

(54) MANAGEMENT OF SUB-PROBLEMS IN A DYNAMIC CONSTRAINT SATISFACTION PROBLEM SOLVER

(75) Inventors: Michael Colena, Lowell, MA (US); Gao Chen, Malden, MA (US)

(73) Assignee: Oracle International Corporation, Redwood Shores, CA (US)

( * ) Notice: Subject to any disclaimer, the term of this patent is extended or adjusted under 35 U.S.C. 154(b) by 631 days.

(21) Appl. No.: 12/270,414

(22) Filed: Nov. 13, 2008

(65) Prior Publication Data

US 2010/0121802 A1 May 13, 2010

(51) Int. Cl.
*G06F 17/00* (2006.01)
*G06N 5/02* (2006.01)
(52) U.S. Cl. .......................................... 706/46
(58) Field of Classification Search .................... 706/46
See application file for complete search history.

(56) References Cited

U.S. PATENT DOCUMENTS

| | | | |
|---|---|---|---|
| 7,069,537 B2 | 6/2006 | Lazarov | |
| 7,333,968 B2 | 2/2008 | Geller et al. | |
| 7,487,445 B2* | 2/2009 | Purvis et al. | 715/249 |
| 7,512,481 B2* | 3/2009 | Julich et al. | 701/117 |
| 7,558,740 B2* | 7/2009 | Matheson et al. | 705/7.26 |
| 7,680,750 B2* | 3/2010 | Daum et al. | 706/19 |
| 7,715,977 B2* | 5/2010 | Julich et al. | 701/117 |
| 7,725,249 B2* | 5/2010 | Kickbusch et al. | 701/117 |
| 7,734,383 B2* | 6/2010 | Philp et al. | 701/19 |
| 7,797,087 B2* | 9/2010 | Philp et al. | 701/19 |
| 7,797,088 B2* | 9/2010 | Philp et al. | 701/19 |
| 7,813,846 B2* | 10/2010 | Wills et al. | 701/19 |
| 7,844,919 B1* | 11/2010 | Gupta et al. | 715/853 |
| 7,908,047 B2* | 3/2011 | Smith et al. | 701/19 |
| 7,937,193 B2* | 5/2011 | Philp et al. | 701/19 |
| 2002/0107749 A1 | 8/2002 | Leslie et al. | |
| 2002/0143653 A1 | 10/2002 | DiLena et al. | |
| 2002/0166089 A1 | 11/2002 | Noy | |
| 2004/0019852 A1 | 1/2004 | Purvis | |
| 2005/0198621 A1 | 9/2005 | Tillmann et al. | |
| 2005/0278271 A1 | 12/2005 | Anthony et al. | |
| 2007/0094184 A1 | 4/2007 | Emek et al. | |

OTHER PUBLICATIONS

Using a Gene-Splicing Based Search Technique for Complex Multi-level Resource Assignment Problems, Kaslow, D.; Shupp, J.; Aerospace Conference, 2008 IEEE Digital Object Identifier: 10.1109/AERO.2008.4526652 Publication Year: 2008 , pp. 1-10.*

Study on the Application of Dynamic Balanced Scorecard in the Service Industry, Tiezhu Zhang; Le Gao; Intelligent Computation Technology and Automation (ICICTA), 2008 International Conference on vol. 1 Digital Object Identifier: 10.1109/ICICTA.2008.359 Publication Year: 2008 , pp. 1158-1162.*

(Continued)

*Primary Examiner* — Michael B Holmes
(74) *Attorney, Agent, or Firm* — Squire, Sanders & Dempsey (US) LLP

(57) ABSTRACT

A solver solves a dynamic constraint satisfaction problem that is modeled as a constraint network of variables and constraints. The solver generates a dynamic sub-problem facility that includes one or more sub-problem pools that each comprises a sub-problem type, one or more sub-problems for the sub-problem type, and one or more clients for the sub-problem type. The solver generates a sub-problem set domain that comprises zero or more included sub-problems and zero or more excluded sub-problems. The solver synchronizes the sub-problem set domain with the dynamic sub-problem facility.

17 Claims, 10 Drawing Sheets

OTHER PUBLICATIONS

Frühwirth, Thom et al., "Principles of Constraint Systems and Constraint Solvers" Archives of Control Sciences: Special Issue on Constraint Programming, 16(2) http://www.informatik.uni-ulm.de/pm/mitarbeiter/fruehwirth/Papers/acs-systems3.pdf, 2006.

Lhomme, Olivier, "Consistency Techniques for Numeric CSPs", Proceedings in IJCAI-93 pp. 232-238, 1993 Chambery, France.

Selectica, "Selectica Configuration" Solution Overview, 2005, Selectica, Inc., San Jose, CA.

ILOG, "ILOG Configurator, Powering online product and service configuration applications", Product Datasheet, Mar. 2005, ILOG.S.A.

Oracle, "Oracle Configurator", Oracle Data Sheet, 2008, Oracle.

Tacton, "Tacton's Sales Configurator—Bridging the gap between engineering and sales for selling customized products.", http://www.tacton.com/templates/page_68.aspx?epslanguage=EN, 2007, Tacton Systems AB, Sweden.

Benhamou, Frédérick et al., "Applying Interval Arithmetic to Real, Integer and Boolean Constraints", Journal of Logic Programming, 32(1), 1997.

Sabin, Daniel et al., "Configuration as Composite Constraint Satisfaction", Proceedings of the ($1^{st}$) Artificial Intelligence and Manufacturing Research Planning Workshop, 1996.

Fleischanderl, Gerhard et al., "Configuring Large Systems Using Generative Constraint Satisfaction", IEEE, pp. 59-68, No. 1094-7167/98, Jul./Aug. 2008, IEEE.

Application Number to Be Assigned.Mittal, Sanjay et al., "Dynamic Constraint Satisfaction Problems", Proceedings of the Eighth National Conference on Artificial Intelligence, 1996.

Stumptner, Markus et al., "Generative Constraint-Based Configuration or Large Technical Systems", Artificial Intelligence for Engineering Design, analysis and Manufacturing, pp. 307-320, No. 12, 1998, Cambridge University Press, USA.

Gelle, Esther et al., "Solving Methods for Conditional Constraint Satisfaction", IJCAL, 2003.

* cited by examiner

202 TV
|_Size (Diagonal) [19..70]
|_Weight (lbs.) [20..250]
|_Wall-Mountable {false, true}
|_HDMI Inputs [0..6]
|_DVI-D Input {false, true}

Fig. 2a

204 Home Theater
|_Seating Distance [30..150]
|_Video Screen [1..1]{TV}
|_AV Component [0..6]{AV Comp}

Fig. 2b

MANAGEMENT OF SUB-PROBLEMS IN A DYNAMIC CONSTRAINT SATISFACTION PROBLEM SOLVER

FIELD OF THE INVENTION

One embodiment is directed generally to a computer system, and in particular to a constraint based computer system that solves dynamic constraint satisfaction problems.

BACKGROUND INFORMATION

Many of the tasks that are addressed by decision-making systems and artificial intelligence systems can be represented as constraint satisfaction problems ("CSP"s). In this representation, the task is specified in terms of a set of variables, each of which can assume values in a given domain, and a set of constraints that the variables must simultaneously satisfy. The set of variables, domains and constraints is referred to as a CSP. Each constraint may be expressed as a relation, defined over some subset of the variables, denoting valid combinations of their values. A solution to a CSP is an assignment of a value to all the variables from their respective domains that satisfies all of the constraints.

A constraint based system includes a constraint solver that attempts to find one or more solutions to a given CSP, or prove that no solution exists. Constraint based systems are used for many artificial intelligence related applications and a variety of other applications, including: (1) Product configurators; (2) Robotic control; (3) Temporal reasoning; (4) Natural language processing; (5) Spatial reasoning; (6) Test-case generation for software and hardware systems; (7) Machine vision; (8) Medical diagnosis; (9) Resource allocation; and (10) Frequency allocation.

The network of constraints in a CSP can be viewed as a graph, having a node for each variable and "arc" for each constraint. The members of each arc are the variables that appear in the constraint to which the arc corresponds. An arc is said to be consistent if for any variable of the arc, and any value in the domain of the variable, there is a valid assignment of values to the other variables on the arc that satisfies the constraint represented by the arc.

Classes of problems exist which are comprised of very large sets of variables that may only be conditionally related or required for a solution. One example of such problems is the configuration of large component-based systems. For example, selecting a type of hard disk controller for a computer configuration is not needed if a hard disk has not been chosen as a form of storage. If instead flash memory is chosen, a different set of variables and constraints would be required to be solved. Known CSP solvers do not allow the representation of conditional structure or reasoning over an inclusion of a variable in a solution. Techniques have been developed to allow such large problems to be represented as a set of smaller sub-problems, conditionally related through composition or association. A "dynamic constraint satisfaction problem" is one in which these sub-problems of variables and constraints can be incrementally added as required, either explicitly or as a result of inference from the propagation of constraints.

One known approach to minimize large CSP problems is referred to as "Conditional CSP", and includes the notion of a variable being active or inactive, as well as constraints to activate a variable. In this approach, a variable is only assigned a value in the final solution if it is active. Conditional CSP is limited in that it does not provide any significant space savings in large problems, nor does it allow for segmentation of related variables into sub-problems. Another known approach is referred to as "Generative CSP" and extends Conditional CSP by introducing the concept of components, which are groups of related variables, and component type, which is the further extension and specialization of these components. However, similar to Conditional CSP, Generative CSP is still implemented in terms of activity state and does not provide real space savings.

SUMMARY OF THE INVENTION

One embodiment is a solver that solves a dynamic constraint satisfaction problem that is modeled as a constraint network of variables and constraints. The solver generates a dynamic sub-problem facility that includes one or more sub-problem pools that each comprises a sub-problem type, one or more sub-problems for the sub-problem type, and one or more clients for the sub-problem type. The solver generates a sub-problem set domain that comprises zero or more included sub-problems and zero or more excluded sub-problems. The solver synchronizes the sub-problem set domain with the dynamic sub-problem facility.

BRIEF DESCRIPTION OF THE DRAWINGS

FIG. 2a is an example of a CSP model definition for a television component type "TV" in accordance to one embodiment.

FIG. 2b is a CSP model definition for a "Home Theater" type in accordance to one embodiment.

DETAILED DESCRIPTION

One embodiment is a dynamic constraint based system that models a problem as a Constraint Satisfaction Problem by defining sub-problems and encapsulating the sub-problem variables and constraints. The sub-problems can be stored and managed so they can be independently reused in different sub-problem sets and solutions.

Figure 1:
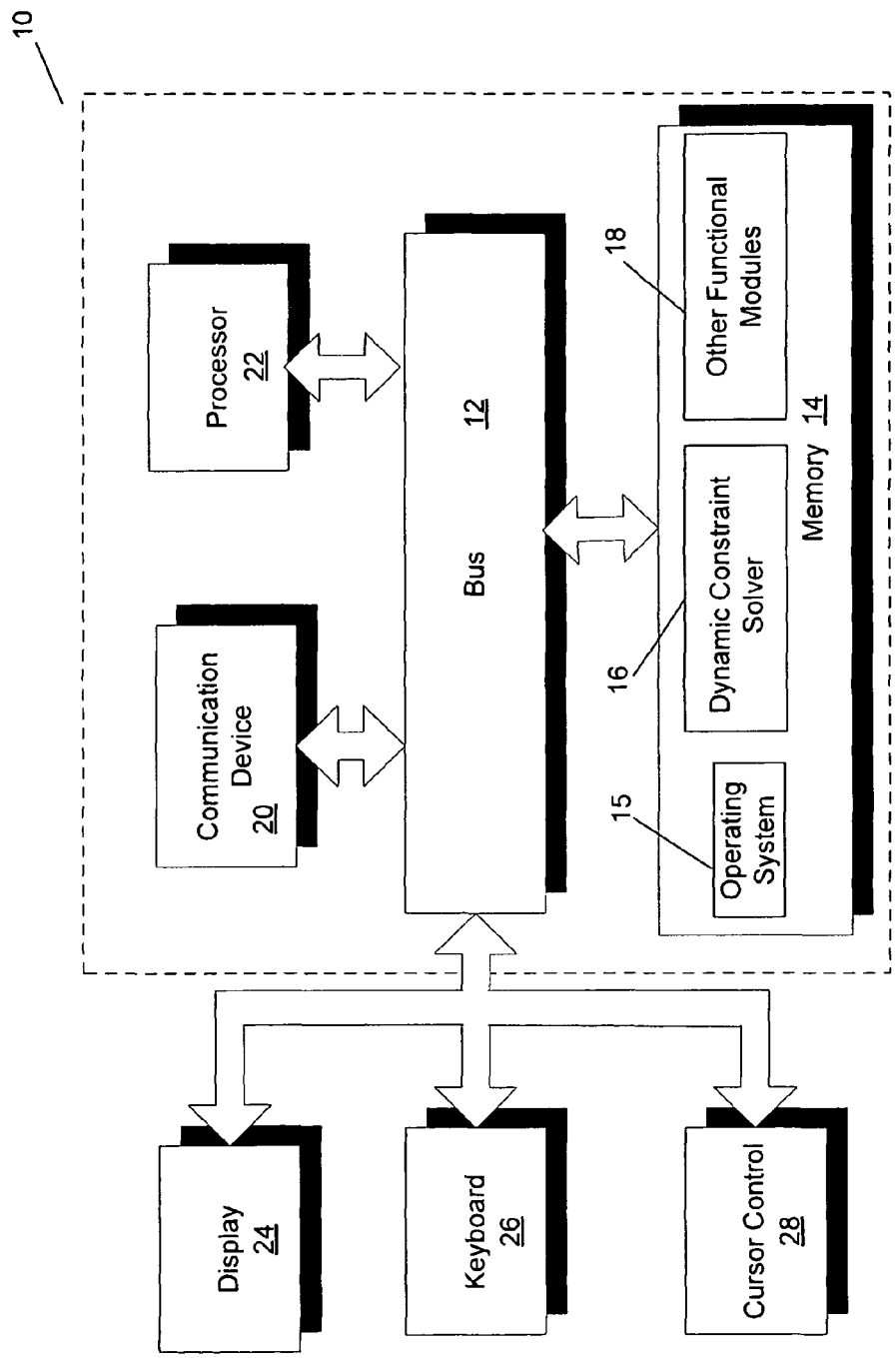
FIG. 1 is a block diagram of a dynamic constraint based system that can implement an embodiment of the present invention.

FIG. 1 is a block diagram of a dynamic constraint based system 10 that can implement an embodiment of the present invention. System 10 includes a bus 12 or other communication mechanism for communicating information, and a processor 22 coupled to bus 12 for processing information. Processor 22 may be any type of general or specific purpose processor. System 10 further includes a memory 14 for storing information and instructions to be executed by processor 22. Memory 14 can be comprised of any combination of random access memory ("RAM"), read only memory ("ROM"), static storage such as a magnetic or optical disk, or any other type of computer readable media. System 10 further includes a communication device 20, such as a network interface card, to provide access to a network. Therefore, a user may interface with system 10 directly, or remotely through a network or any other method.

Computer readable media may be any available media that can be accessed by processor 22 and includes both volatile and nonvolatile media, removable and non-removable media, and communication media. Communication media may include computer readable instructions, data structures, program modules or other data in a modulated data signal such as a carrier wave or other transport mechanism and includes any information delivery media.

Processor 22 is further coupled via bus 12 to a display 24, such as a Liquid Crystal Display ("LCD"), for displaying information to a user. A keyboard 26 and a cursor control device 28, such as a computer mouse, is further coupled to bus 12 to enable a user to interface with system 10.

In one embodiment, memory 14 stores software modules that provide functionality when executed by processor 22. The modules include an operating system 15 that provides operating system functionality for system 10. The modules further include a dynamic constraint solver module 16 that performs dynamic constraint solving and sub-problem storage as disclosed in more detail below. System 10 can be part of a larger system that includes a constraint solver, such as a product configurator or artificial intelligence system. Therefore, system 10 will typically include one or more additional functional modules 18 to include the additional functionality.

In one embodiment, a problem to be solved is modeled as a CSP. The CSP model definition may include variables that further encapsulate an optional, type-abstracted CSP sub-problem. Embodiments ensure that a minimal required set of variables is present in the system, and include methods to expand or reduce the set of variables as required by the solution.

FIG. 2a is an example of a CSP model definition 202 for a television component type "TV" in accordance to one embodiment. Model definition 202 includes a list of variables (e.g., size, weight, etc.) and the domains for each variable (e.g., for "size" the domain is the range of 19-70, for "wall-mountable" the domain is "false" or "true"). An example of a constraint of model definition 202 is "Televisions weighing more than 175 pounds cannot be wall-mounted". Model definition 202 is a CSP model that includes all variables and constraints required to model the properties of a television.

Model definition 202 may be used as a defined sub-problem model for another CSP model. For example, FIG. 2b is a CSP model definition 204 for a "Home Theater" type. Model definition 204 includes a variable "Video Screen" which is defined as an instance of the sub-problem TV defined by model definition 202 as indicated by the "TV" within the curly brackets. Model definition 204 further includes constraints. An example of a constraint for model definition 204 is "Seating distance is at least twice the screen size".

In one embodiment, the sub-problem type is further abstracted to group explicit types into an inheritance hierarchy that provides efficient reasoning, similar to object oriented programming. Abstracting common features of two types, "A" and "B", into a common super type "C" means that these features are now described without redundancy. On the individual component level, type abstraction also allows efficient reasoning. For example, for a given point in time if it is not clear whether type A or B will be advantageous for a certain component, then the common properties and constraints represented by C can already be used to prune the search space, without precluding any choice. A child type inherits all variables and constraints of its parent type, and can add additional variables and constraints.

Type abstraction represents a hierarchy of abstract types and concrete types. An abstract type in the hierarchy possesses the set of properties that correspond to the intersection of all properties of its subtypes. For example, after a component has been assigned an abstract type "t", its type assignment will later need to be refined to a subtype of t either by the constraint solver explicitly choosing that variable for refinement, or because filtering removes other subtypes of t from consideration. A valid final assignment (to be part of a solution) will then be the assignment of a concrete type.

Figure 3:
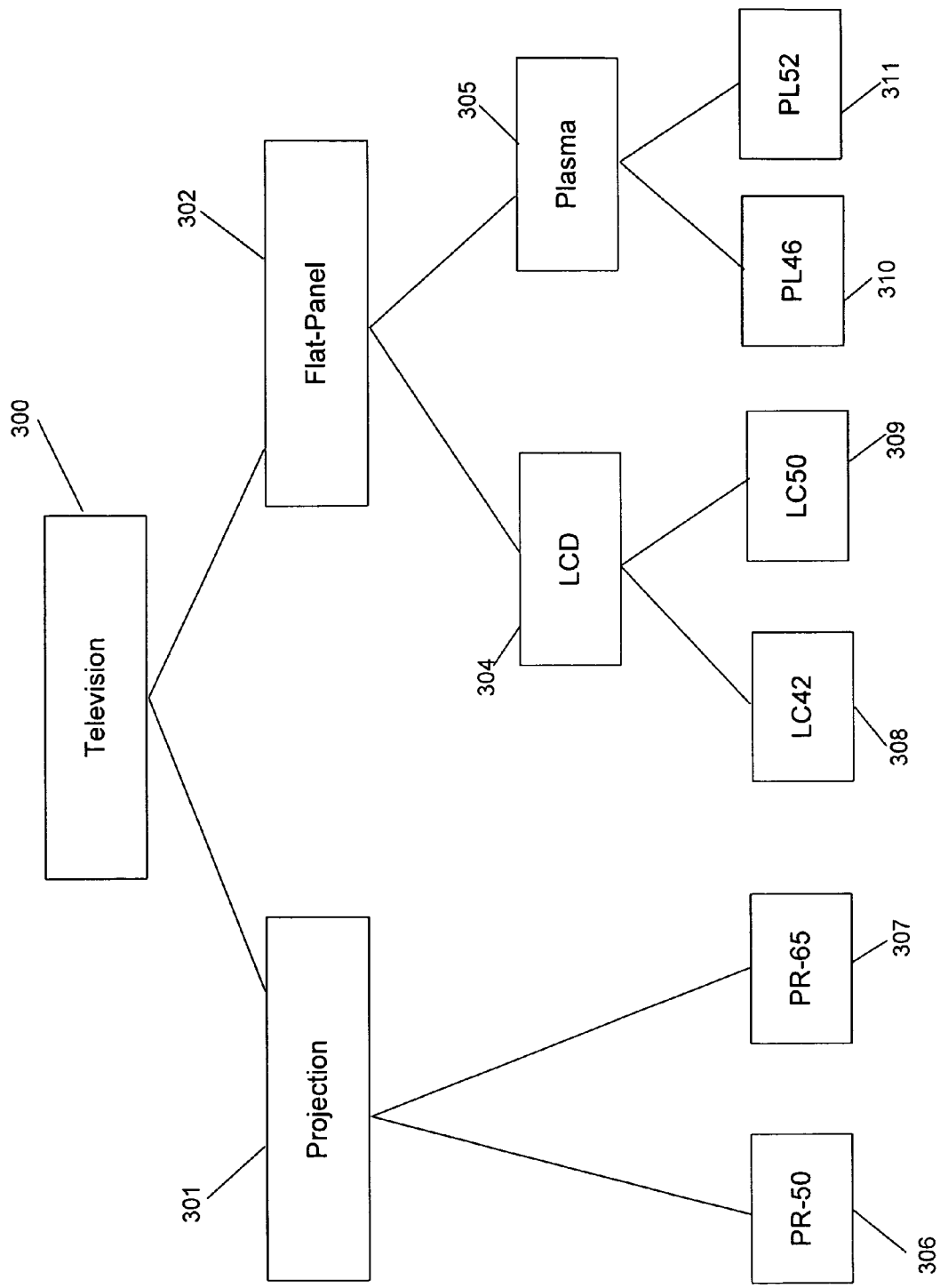
FIG. 3 is an example of a type hierarchy for a television in accordance with one embodiment.

FIG. 3 is an example of a type hierarchy for a television in accordance with one embodiment. "Television" class 300 represents a "super" type class that includes a "Projection" class 301 and a "Flat-Panel" class 302. Flat-panel class 302 includes an "LCD" class 304 and a "Plasma" class 305. Concrete types 306-311 are the specific models of televisions that can be chosen with the Television type (e.g., PR-50, LC42, etc.). Since, for example, LCD class 304 and Plasma class 305 are subclasses of Flat-Panel class 302, they can each have different properties. For example, LCD class 304 may have properties regarding a type of backlighting that would not apply to plasma televisions, while Plasma class 305 may have properties regarding a type of gas that would not apply to LCD televisions.

Figure 4:
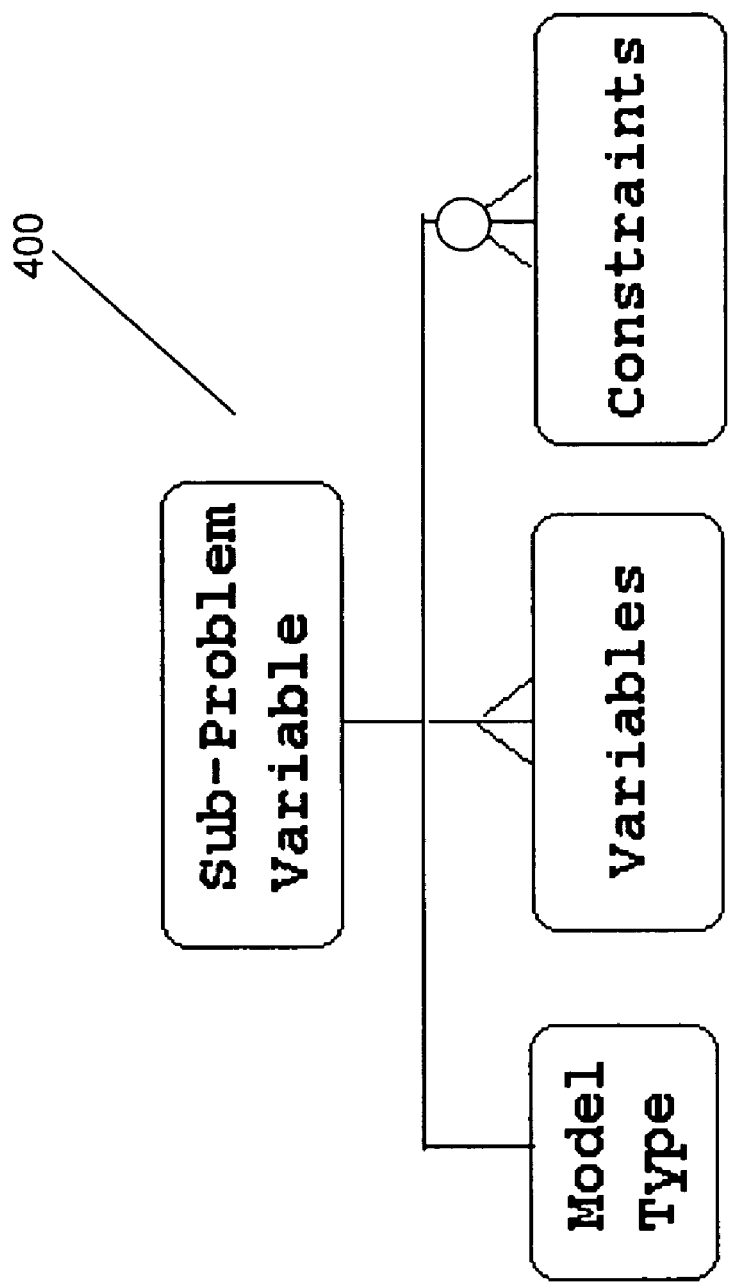
FIG. 4 is a data structure diagram that illustrates the composition of a sub-problem variable in accordance with one embodiment.

In one embodiment, dynamic constraint solver 16 utilizes the hierarchical structure of FIG. 3 to provide an encapsulation of a set of sub-problem variables and constraints into a single variable. In dynamic structured problems, there may be two types of structures defined through different problem set variables. One type represents a composition relationship to sub-problems. The other type represents an association relationship to peer problem instances. The dynamic structure allows for efficient management of the variables and constraints related to a given sub-problem. FIG. 4 is a data structure diagram 400 that illustrates the composition of a sub-problem variable in accordance with one embodiment. As shown in diagram 400, the single sub-problem variable includes the model type (e.g., the "Television" type of FIG. 3), one or more variables, and zero or more constraints. Data structure diagram 400 is an actual encapsulation of the sub-problem elements into a single variable as opposed to the virtual grouping that is done in known CSP systems.

Figure 5:
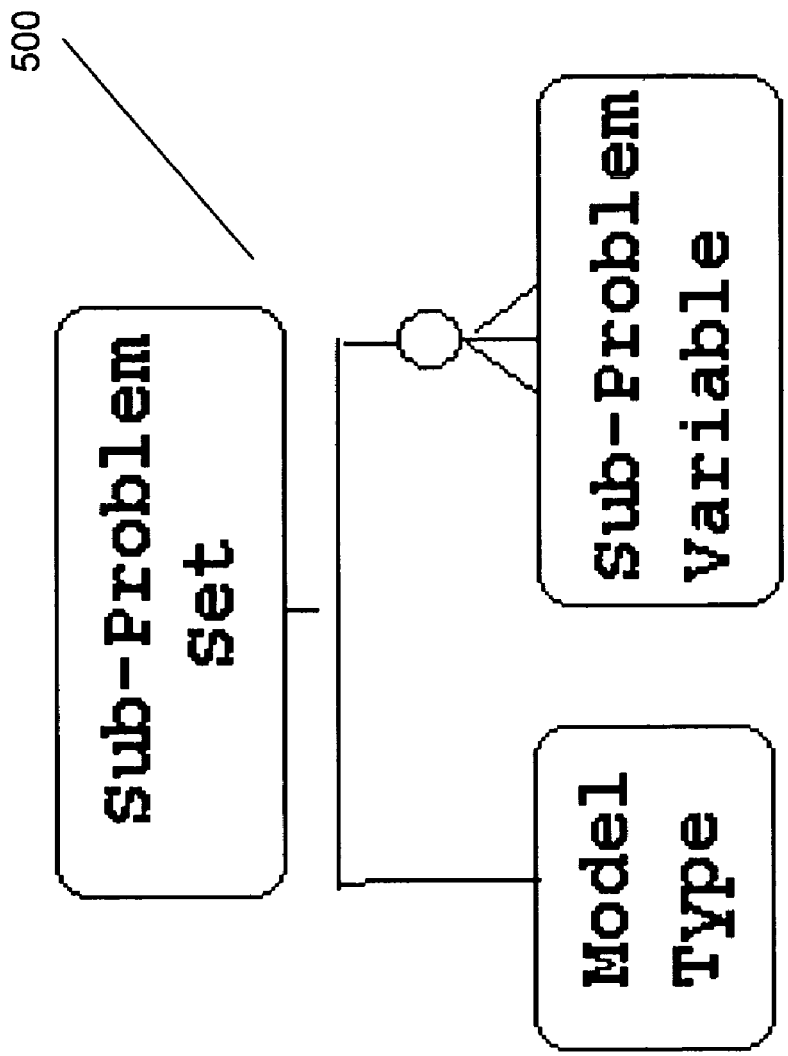
FIG. 5 is a data structure diagram that represents the composition of a sub-problem set variable in accordance with one embodiment.

In one embodiment, dynamic constraint solver 16 provides a sub-problem set variable that represents a set of optional sub-problem variables. This allows a sub-problem to be both conditionally and multiply instantiated in the solution. FIG. 5 is a data structure diagram 500 that represents the composition of a sub-problem set variable in accordance with one embodiment. The sub-problem set includes a model type (e.g., the "Television" type of FIG. 3) and a set of zero or more sub-problem variables (e.g., the sub-problem variable of FIG. 4) of the given type. As an example, for the model type "Home Theater" of FIG. 2b, the variable "AV Component" is an optional and multi-instantiable sub-problem set because it has a domain cardinality of 0.6.

In one embodiment, dynamic constraint solver 16 instantiates an encapsulated sub-problem, and adds it to the primary problem, thereby extending the set of variables in the solution. This is done in a manner that avoids the necessity of restarting and redefining the problem as is required by many prior art solvers. In one embodiment, a constraint problem to be solved by dynamic constraint solver 16 is modeled as a constraint network that includes a node for each variable in the problem and an edge between the nodes for each constraint in the problem. A choice of a value for a variable can be made by a user or through some other means. For example, if the problem is for a product configurator, a user makes a choice when interacting with the configurator model. The user choice may be a representation of an action by the user in the configurator user interface ("UI"). Examples of a user choice include clicking a checkbox, entering a number in a box, choosing a number or choice within a drop down box, etc. The user choices (or choices made in any other manner) are added and managed in a manner that allows for efficient backtracking and/or negation.

Figure 6:
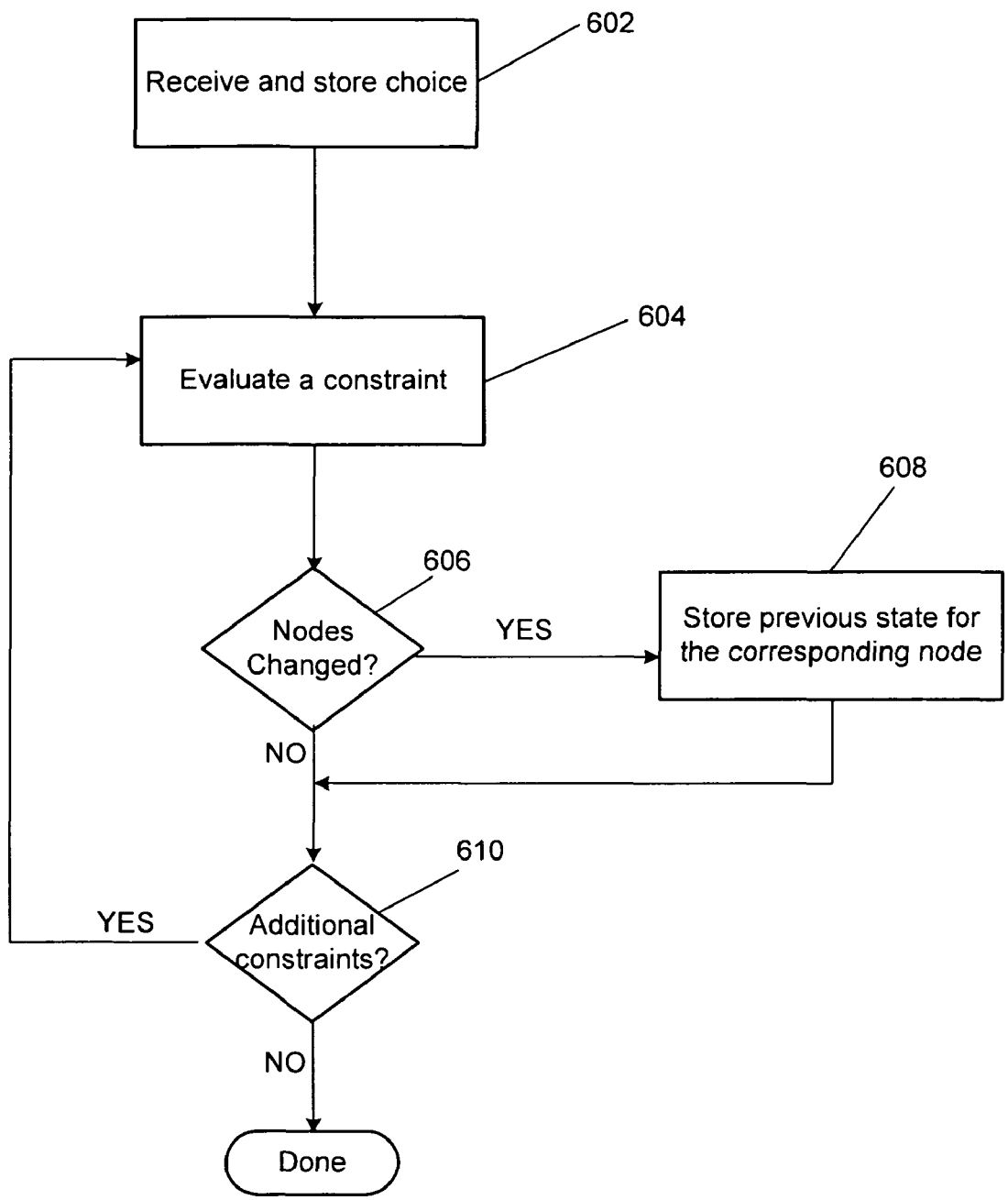
FIG. 6 is a flow diagram of the functionality of the dynamic constraint solver when a choice is made in the constraint model in accordance with one embodiment.

FIG. 6 is a flow diagram of the functionality of dynamic constraint solver 16 when a choice is made in the constraint model in accordance with one embodiment. In one embodiment, the functionality of the flow diagram of FIG. 6, and FIGS. 7 and 10 below, is implemented by software stored in memory or other computer readable or tangible medium, and executed by a processor. In other embodiments, the functionality may be performed by hardware (e.g., through the use of an application specific integrated circuit ("ASIC"), a programmable gate array ("PGA"), a field programmable gate array ("FPGA"), etc.), or any combination of hardware and software.

At 602, the choice is received and stored. The choice can be stored using any type of internal representation of the choice and in one embodiment is stored in memory 14. The choice at 602 may cause one or more associated outward constraints in the constraint network to be affected (i.e., due to the propagation of the choice throughout the constraint network), which may modify the associated node for each constraint.

At 604, the first/next outward constraint affected by the choice at 602 is evaluated.

At 606, it is determined if the nodes for the constraint have changed. If so, at 608 the previous state for each changed node is stored and associated with the added choice at 602.

At 610, if the nodes for the constraint have not changed, or after storing the previous state at 608, it is determined if there are additional constraints to evaluate from the choice. If there are, the flow returns to 604. In this manner, the propagation of the entire constraint network as a result of the choice 602 is evaluated and the previous state of any nodes that have changed in response to the choice is saved.

Figure 7:
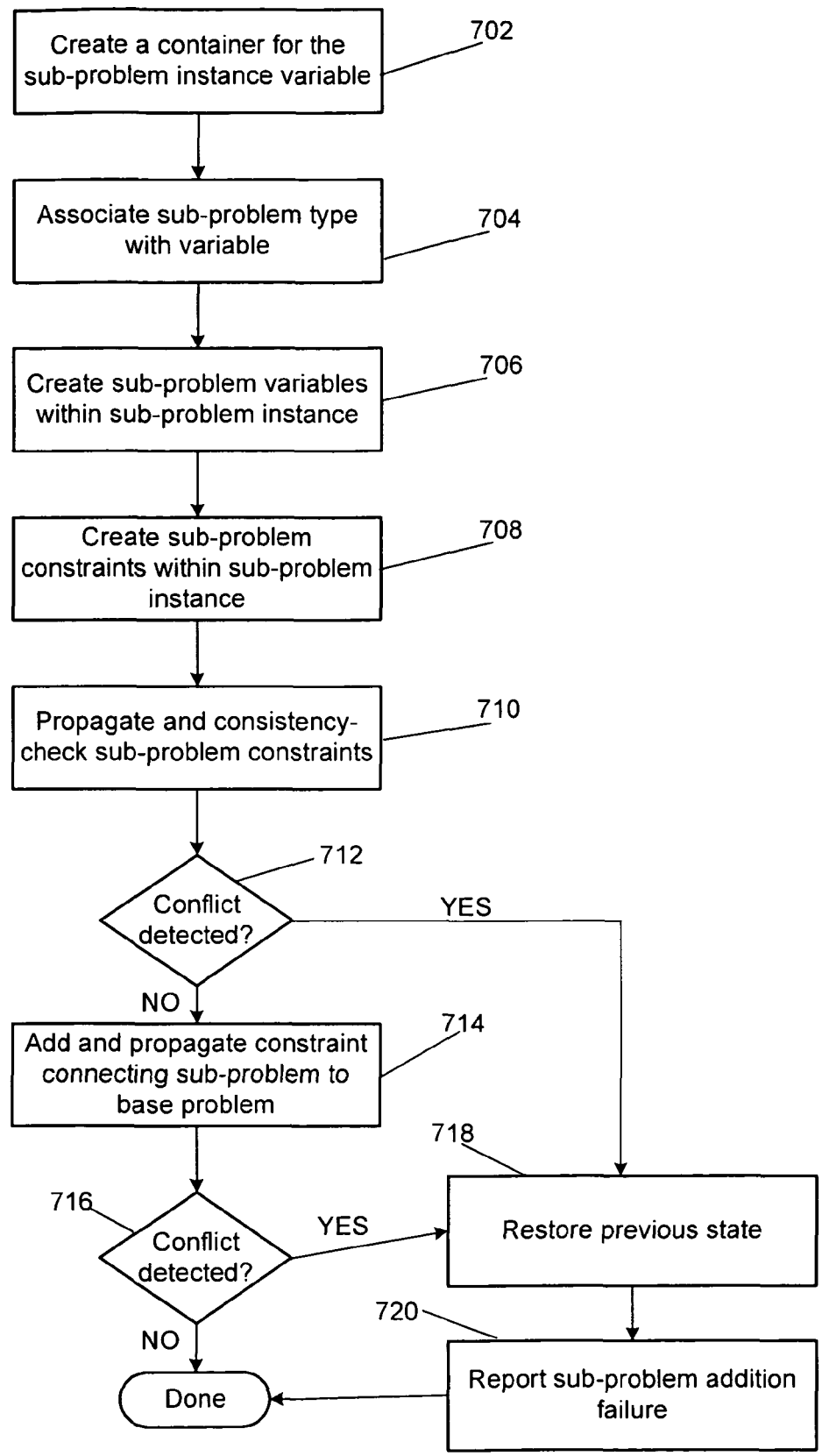
FIG. 7 is a flow diagram of the functionality of the dynamic constraint solver when creating/instantiating an encapsulated sub-problem and connecting it to the base/primary problem.

When the functionality of FIG. 6 is complete, for each node affected by propagation in the constraint network, the prior domain state is recorded and is associated with the current choice. In one embodiment, dynamic constraint solver 16 instantiates an encapsulated sub-problem, and adds it to the primary problem, thereby extending the set of variables in the solution. Because the prior art domain state has been recorded/stored, this is done in a manner that avoids the necessity to restart and redefine the problem as is required by prior art constraint solver systems. Further, dynamic constraint solver 16 views the sub-problem set as including all possibilities from the beginning when adding a sub-problem. Therefore, adding a sub-problem is reducing rather than expanding the problem, which also avoids the need for restarting. FIG. 7 is a flow diagram of the functionality of dynamic constraint solver 16 when creating/instantiating an encapsulated sub-problem and "connecting" (i.e., through an association relationship or a composition relationship) it to the base/primary problem.

At 702, a "container" for the encapsulation of the sub-problem instance variable is created.

At 704, the sub-problem type is associated with a variable. As disclosed above, a sub-problem variable has a type such as the "TV" type of FIG. 2*a*.

At 706, sub-problems variables are created within the sub-problem instance. For example, the TV type of FIG. 2*a* has variables "Size", "Weight", etc.

At 708, sub-problem constraints are created within the sub-problem instance. At this point, all information needed for the data structure diagram 400 of FIG. 4 that represents the sub-problem variable has been assembled.

At 710, the sub-problem constraints are propagated and consistency-checked on the constraint network. The propagation at 710 is an initial consistency checking of the sub-problem constraints to establish their starting state, given the runtime state of the CSP problem. Therefore, the functionality of FIG. 6, starting at 604, is executed when each constraint is propagated. The propagation at this point is limited to the sub-problem variable to reduce the amount of computing necessary.

At 712, it is determined if a conflict is detected as a result of the propagation of the constraint.

If a conflict is detected at 712, at 718 the prior state of the nodes is restored so that the state of the network reverts to its state prior to the creation and propagation of the constraints. Because the functionality of FIG. 6 was executed, the prior state has been recorded and associated with the current constraint before the constraint was propagated. At 720, the failure of the sub-problem addition is reported.

If no conflict was detected at 712, at 714 the constraint connecting the sub-problem to the base problem is added and propagated and the sub-problem set of FIG. 5 is successfully instantiated. In one embodiment, connecting the sub-problem to the base problem is similar to storing an arbitrary association of a component to structure in a CSP solver. In one embodiment, the association of the base problem and the sub-problem is stored in memory 14.

At 716, it is determined if a conflict is detected as a result of the propagation of the constraint. If a conflict is detected, the functionality continues at 718 where the previous state of the nodes is restored.

Because of the functionality of FIG. 7, dynamic constraint solver 16 can revert the sub-problem instantiation, thereby ensuring efficient backtracking. Because the sub-problem variables and constraints are encapsulated within the sub-problem instance variable, and the sole connection to the base problem is via a connection constraint, removing the instance becomes a simple matter of removing the connection constraint. The sub-problem can then either be discarded, or retained for future reuse. Without the connection to the base problem, it is no longer considered part of the solution.

Dynamic constraint solver 16 provides multiple methods for creating and connecting a dynamic sub-problem. In one embodiment, the sub-problem set of FIG. 5 provides application programming interface methods or user interfaces which allow a user to explicitly create an instance of a given sub-problem type, as well as a method to create a connection between the sub-problem instance and the sub-problem set. For example, a button may be displayed on a user interface that allows a user to select "add a TV". This may result in the TV sub-problem to be added to a home entertainment problem set, with the associated constraints and variables.

In another embodiment, dynamic constraint solver 16 provides a method of implicitly creating and connecting in the solution a dynamic sub-problem by reasoning over the cardinality of the containing set variable. The sub-problem set of FIG. 5 includes among its properties a cardinality, which is a reflection of the number of members within the set. The cardinality of the sub-problem set can be reasoned over by constraints as any numeric variable. As an example, for SubProblemSet.card( ).gt(0), adding a numeric constraint enforcing that the cardinality of the "SubProblemSet" variable is greater than 0 may lead to the automatic addition of sub-problem variables to the set.

In another embodiment, dynamic constraint solver 16 provides a method of implicitly creating and connecting in the solution a dynamic sub-problem by reasoning over the abstract component type of the containing set variable. The sub-problem set of FIG. 5 includes among its properties a type, which is a reflection of the type or family of types of the sub-problem variables within the set. The type of the sub-problem set can be reasoned over by constraints as any variable. As an example, for Video_Screen.isType(PL52), using the variables and types disclosed in FIGS. 2a, 2b and 3 above, specifying that the "Video Screen" may only be of type "PL52" will cause an instance of a sub-problem variable of type "PL52" to be created within the "Video Screen" set.

As disclosed above, for solving a Dynamic CSP in one embodiment sub-problems of variables and constraints can be incrementally added as required, either explicitly or as a result of inference from the propagation of constraints. As with sub-problem additions, problems involving the generation and placement of components often exhibit symmetry under the interchange of component associations. For example, consider a computer system composed of cards in slots. If a solution consisting of card A in slot 1 and card B in slot 2 satisfies a given set of requirements, it is possible that the solution consisting of card B in slot 1 and card A in slot 2 is equally satisfactory. This symmetry introduces a degree of arbitrariness to the way in which inferences involving component existence and association are exhibited during an interactive session with a configurator or any other application that solves a CSP. Having determined, for instance, that card A is required in the solution, the solver may reasonably place it in slot 1, even though it may equally well have gone in slot 2.

A typical constraint solver system finds a solution to a given problem by making assignments to variables, and well as backtracking over those assignments to explore alternatives, until a complete set of assignments is found which respects all of the problem constraints. Because the solution to a Dynamic CSP can expand to include multiple optional sub-problems, the process of searching and backtracking can lead to the repeated addition and removal of sub-problems to find a valid solution. Further, symmetries may exist in the CSP that lead to the generation of identical sub-problems in the solution. Without careful considerations, this process can have detrimental results on performance.

In response, in order to minimize the costs associated with adding a dynamic sub-problem to a CSP, one embodiment of the system specifically manages and reuses sub-problems and provides a domain implementation for sub-problems that allows the system to reason over both absolute and potential sub-problems.

Figure 8:
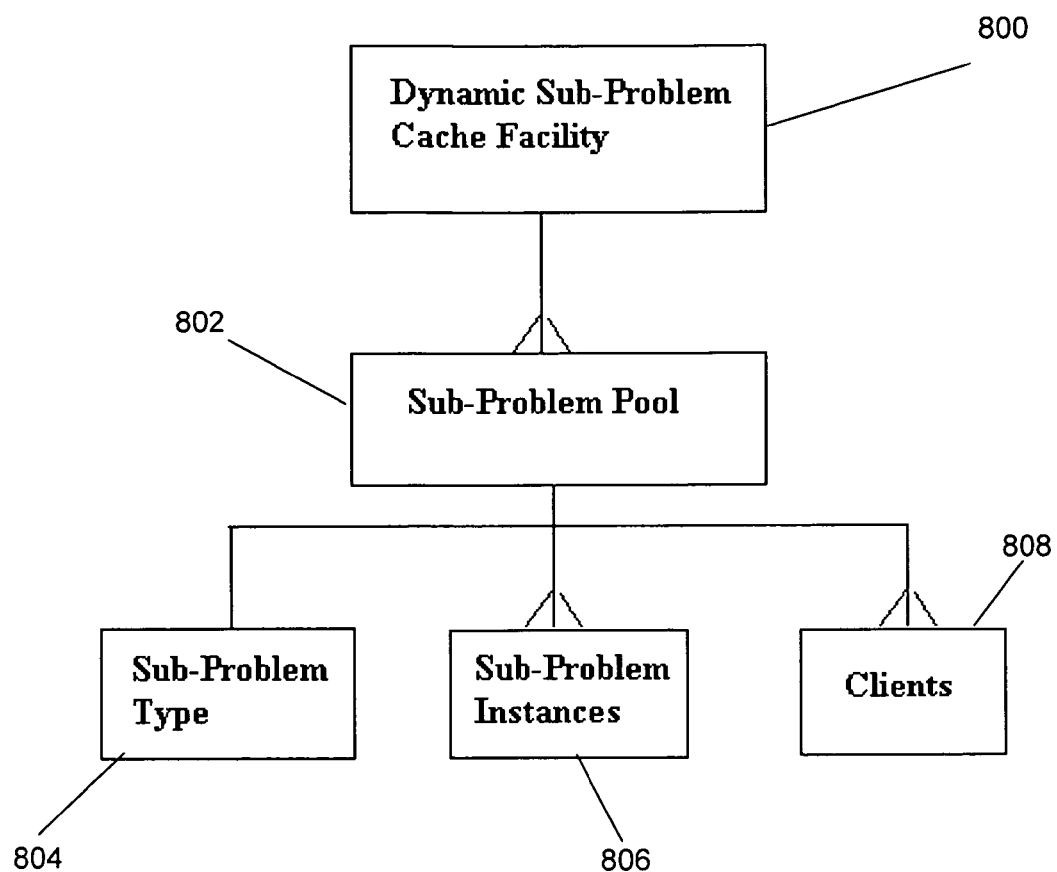
FIG. 8 illustrates a sub-problem cache facility in accordance with one embodiment.

FIG. 8 illustrates a dynamic sub-problem "cache" facility or dynamic sub-problem data structure 800 in accordance with one embodiment that is stored in memory (such as memory 14 of FIG. 1) and is used to manage dynamic sub-problems. In one embodiment, data structure 800 is stored in high speed cache memory that stores dynamic sub-problems and allows for the reuse of independent sub-problems. The cache allows higher access speeds relative to other forms of memory such as RAM or disk memory. In other embodiments, sub-problem data structure 800 can be stored in any type of memory. Cache facility 800 sorts dynamic sub-problems into type-specific pools 802. Each pool 802 includes sub-problem instances 806 of a given sub-problem type 804 that share common properties (e.g., variables and constraints) and that can be used interchangeably by any "client" 808 of the given type. Client 808 can be any ports/sub-problem sets (i.e., sub-problem set 500 of FIG. 5) that can be coupled to the sub-problem. Each type-specific pool 802 manages the set of sub-problem instances 806, as well as any of the clients 808 which may be interested in these sub-problems. For example, for the TV sub-problem 202 of FIG. 2a, a "client" for a home configurator could be a living room, a bedroom, or a home theater such as home theater sub-problem set 204 of FIG. 2b. A user can create TV sub-problem 202 in advance and place it in sub-problem pool 802. Then, when a user is configuring, for example, a living room, that TV will be available in sub-problem pool 802 and a user can couple it to the client/living room, so the living room will be configured with the TV as embodied by TV sub-problem 202.

Figure 9:
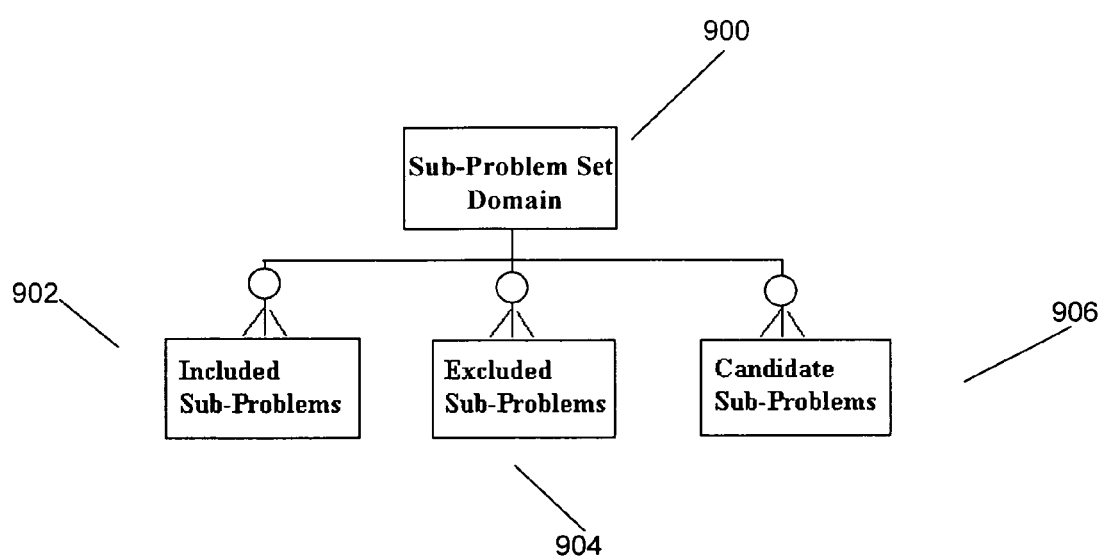
FIG. 9 illustrates a sub-problem set domain object in accordance with one embodiment.

In one embodiment, a data structure of a domain object functions as a set whose domain values are sub-problems. FIG. 9 illustrates a sub-problem set domain object 900 in accordance with one embodiment. Domain object 900 allows for reasoning over and differentiation of sub-problems that are included in the solution and those sub-problems that may be potentially included in the solution. Domain object 900 may be used by a CSP variable to maintain which sub-problem instances are included (902) in the variable domain, which are excluded (904), and which are potential candidates for inclusion (906). An example of an excluded sub-problem would be a prohibition against a TV sub-problem being placed in a living room when solving a home configuration. For example, a TV greater than 50 inches may be prohibited from being placed in a living room due to size or style constraints.

Figure 10:
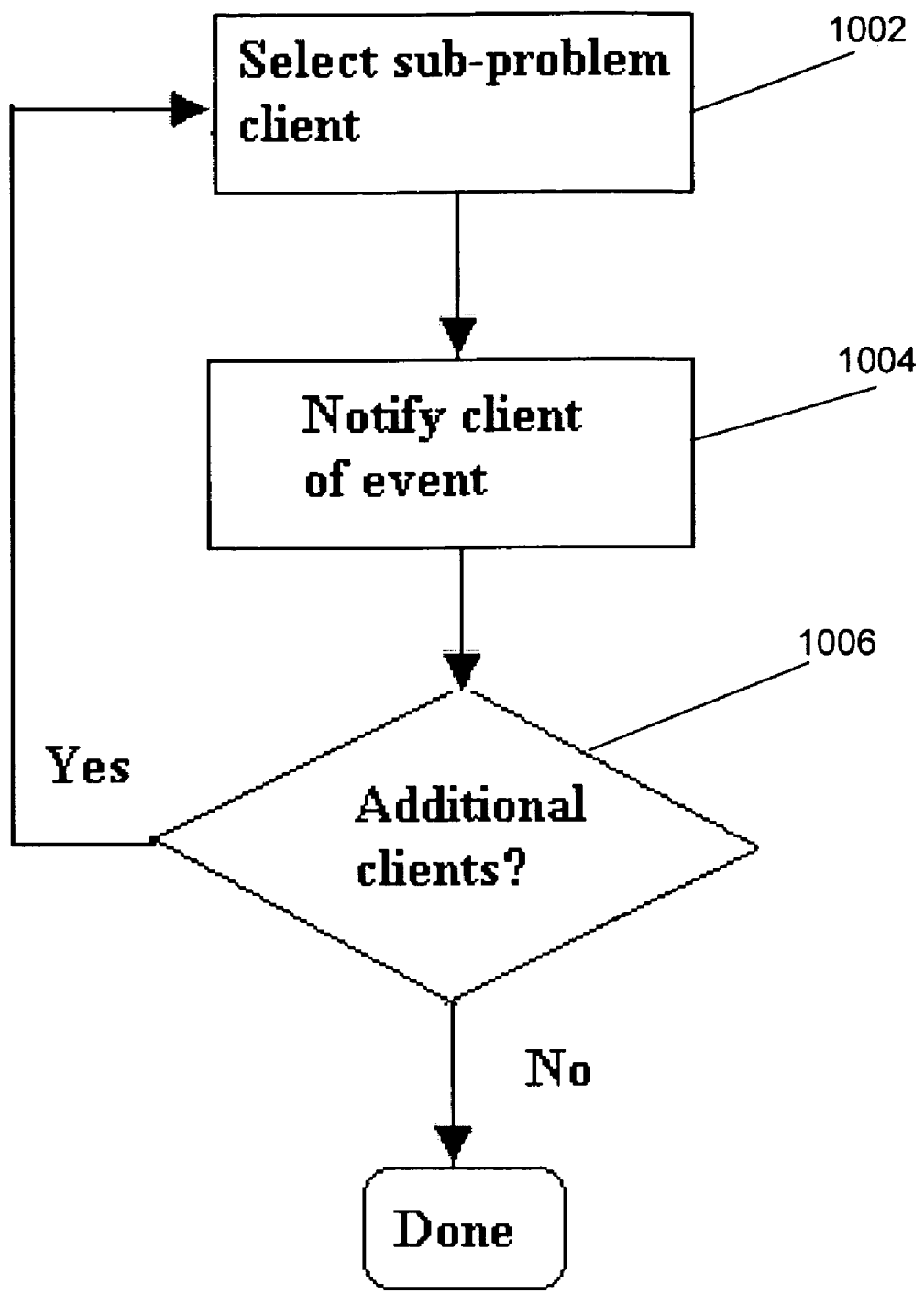
FIG. 10 is a flow diagram of the functionality of dynamic constraint solver when synchronizing domains with the storage cache in accordance with one embodiment.

In one embodiment, dynamic constraint solver 16 synchronizes sub-problem set domain 900 with sub-problem cache 800. This is done to ensure that the domain correctly reflects those sub-problems that may or may not be considered candidates for inclusion in the solution. FIG. 10 is a flow diagram of the functionality of dynamic constraint solver when synchronizing sub-problem set domain 900 with storage cache 800 in accordance with one embodiment.

The synchronization between sub-problem cache 800 and sub-problem set domain 900 is enabled by client list 808 maintained by each sub-problem pool 802 of FIG. 8. When a noteworthy event occurs in sub-problem pool 802, such as the addition or removal of a sub-problem of sub-problem instances 806, at 1002 a first one of the clients registered to that storage pool is selected. Examples of noteworthy events include a sub-problem becoming unavailable to all clients (for example, it may be established that only one sub-problem TV 202 may be used in a configuration and that TV may already have been used), or a new sub-problem becoming available to all clients (for example, a new sub-problem TV 202 may be configured and its availability needs to be communicated to all clients). At 1004, the selected client is notified of the event and can update its internal states accordingly. At 1006, it is determined if there are any other clients registered in the storage pool. If yes, functionality continues at 1002. If no, the functionality ends. The functionality of FIG. 10 enables a single sub-problem to be used and re-used, either exclusively or not, by any sub-problem variable of the given type.

As disclosed, embodiments allow dynamic CSP sub-problems to be added to a sub-problem pool so that the sub-problems are available to and can be easily connected to multiple clients. A notification mechanism informs the clients of the status of the availability of the sub-problems.

Several embodiments are specifically illustrated and/or described herein. However, it will be appreciated that modifications and variations of the disclosed embodiments are covered by the above teachings and within the purview of the appended claims without departing from the spirit and intended scope of the invention.

What is claimed is:

1. A method of solving a dynamic constraint satisfaction problem that comprises a constraint network of variables and constraints, the method comprising:
    generating a dynamic sub-problem facility that comprises one or more sub-problem pools, wherein each sub-problem pool comprises a sub-problem type, one or more sub-problems for the sub-problem type, and one or more clients for the sub-problem type;
    generating a sub-problem set domain that comprises zero or more included sub-problems and zero or more excluded sub-problems; and
    synchronizing the sub-problem set domain with the dynamic sub-problem facility.

2. The method of claim 1, wherein the sub-problem set domain further comprises zero or more candidate sub-problems.

3. The method of claim 1, wherein the synchronizing comprises:
    notifying all first clients of a first sub-problem pool of an event for the first sub-problem pool.

4. The method of claim 3, wherein the event comprises at least one of a first sub-problem becoming unavailable to the first clients and a second sub-problem becoming available to the first clients.

5. The method of claim 1, further comprising storing the dynamic sub-problem facility in high speed memory.

6. The method of claim 1, wherein the one or more sub-problems for the sub-problem type share common properties.

7. The method of claim 6, wherein the common properties comprise at least one of common variables and common constraints.

8. The method of claim 6, wherein the common properties are adapted to be used interchangeably by the one or more clients.

9. The method of claim 1, further comprising:
    dynamically connecting a first sub-problem to a sub-problem set.

10. A dynamic constraint satisfaction problem solver comprising:
    a processor;
    a memory coupled to the processor;
    a constraint network comprising a plurality of variables coupled to a plurality of constraints;
    a dynamic sub-problem facility that comprises one or more sub-problem pools, wherein each sub-problem pool comprises a sub-problem type, one or more sub-problems for the sub-problem type, and one or more clients for the sub-problem type;
    a sub-problem set domain that comprises zero or more included sub-problems and zero or more excluded sub-problems; and
    instructions stored on the memory for synchronizing the sub-problem set domain with the dynamic sub-problem facility.

11. The dynamic constraint satisfaction problem solver of claim 10, wherein the sub-problem set domain further comprises zero or more candidate sub-problems.

12. The dynamic constraint satisfaction problem solver of claim 10, wherein the synchronizing comprises:
    notifying all first clients of a first sub-problem pool of an event for the first sub-problem pool.

13. The dynamic constraint satisfaction problem solver of claim 12, wherein the event comprises at least one of a first sub-problem becoming unavailable to the first clients and a second sub-problem becoming available to the first clients.

14. A computer readable media having instructions stored thereon that, when executed by a processor, causes the processor solve a dynamic constraint satisfaction problem that comprises a constraint network of variables and constraints, the instructions functionality comprising:
    a dynamic sub-problem facility that comprises one or more sub-problem pools, wherein each sub-problem pool comprises a sub-problem type, one or more sub-problems for the sub-problem type, and one or more clients for the sub-problem type;
    a sub-problem set domain that comprises zero or more included sub-problems and zero or more excluded sub-problems; and
    synchronizing the sub-problem set domain with the dynamic sub-problem facility.

15. The computer readable media of claim 14, wherein the sub-problem set domain further comprises zero or more candidate sub-problems.

16. The computer readable media of claim 14, wherein the synchronizing comprises:
    notifying all first clients of a first sub-problem pool of an event for the first sub-problem pool.

17. The computer readable media of claim 16, wherein the event comprises at least one of a first sub-problem becoming unavailable to the first clients and a second sub-problem becoming available to the first clients.

* * * * *